(12) United States Patent
Siminoff et al.

(10) Patent No.: US 8,375,631 B2
(45) Date of Patent: Feb. 19, 2013

(54) MODULAR GARDENING SYSTEM

(75) Inventors: James Siminoff, Pacific Palisades, CA (US); John Modestine, Lansdale, PA (US)

(73) Assignee: Edison Junior, LLC, Pacific Palisades, CA (US)

( * ) Notice: Subject to any disclaimer, the term of this patent is extended or adjusted under 35 U.S.C. 154(b) by 0 days.

(21) Appl. No.: 13/467,502

(22) Filed: May 9, 2012

(65) Prior Publication Data

US 2012/0285085 A1    Nov. 15, 2012

Related U.S. Application Data

(60) Provisional application No. 61/483,993, filed on May 9, 2011.

(51) Int. Cl.
*A01G 31/00* (2006.01)
(52) U.S. Cl. .................................. 47/62 C
(58) Field of Classification Search ............ 47/62 C, 47/62 R, 63, 79, 86, 65.9, 66.1
See application file for complete search history.

(56) References Cited

U.S. PATENT DOCUMENTS

| | | | | |
|---|---|---|---|---|
| 2,336,755 A | * | 12/1943 | Sejarto | 47/62 R |
| 3,992,809 A | * | 11/1976 | Chew | 47/62 R |
| 4,021,964 A | * | 5/1977 | Darwin et al. | 47/62 R |
| 5,076,010 A | * | 12/1991 | Rollins | 47/62 R |
| 5,117,581 A | | 6/1992 | Green et al. | |
| 5,355,618 A | * | 10/1994 | Pedersen | 47/18 |
| 7,861,459 B2 | * | 1/2011 | Brooke et al. | 47/48.5 |
| 7,877,927 B2 | * | 2/2011 | Roy et al. | 47/62 C |
| 2007/0033871 A1 | | 2/2007 | Kelly et al. | |
| 2009/0277085 A1 | | 11/2009 | Stewart | |
| 2010/0139161 A1 | | 6/2010 | Porter | |
| 2010/0199555 A1 | | 8/2010 | Pole | |
| 2010/0307056 A1 | | 12/2010 | Byles | |
| 2011/0016781 A1 | | 1/2011 | Richardson | |
| 2011/0056132 A1 | | 3/2011 | Gardner | |

OTHER PUBLICATIONS

International Search Report and Written Opinion by the International Searching Authority, issued on Jul. 30, 2012, under International Application No. PCT/US12/37092.

* cited by examiner

*Primary Examiner* — Kristen C Hayes

(57) ABSTRACT

A system for modular gardening including a water module having a reservoir coupled to an aperture such that water in the reservoir flows out the water module via the aperture. The system also including a plant module having a housing having an aperture arranged to transfer water with another module and further having an open region on a top surface of the housing, a first conduit within the housing coupling the aperture and a regulator, a second conduit coupled to the regulator, the second conduit providing water to one or more water absorbent layers arranged atop the second conduit, and plant life at least partially embedded in at least one of the one or more water absorbent layers and receiving light through the open region.

17 Claims, 15 Drawing Sheets

2

Figure 5
<u>4</u>
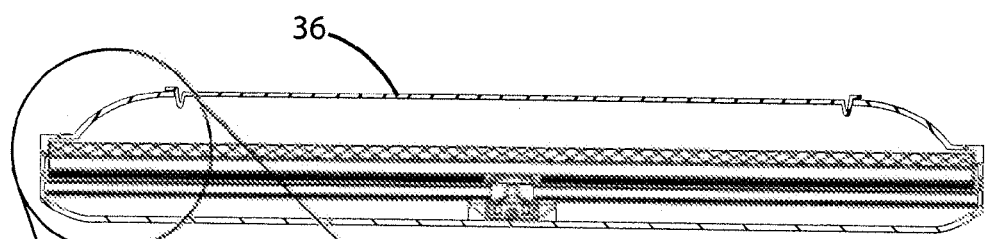
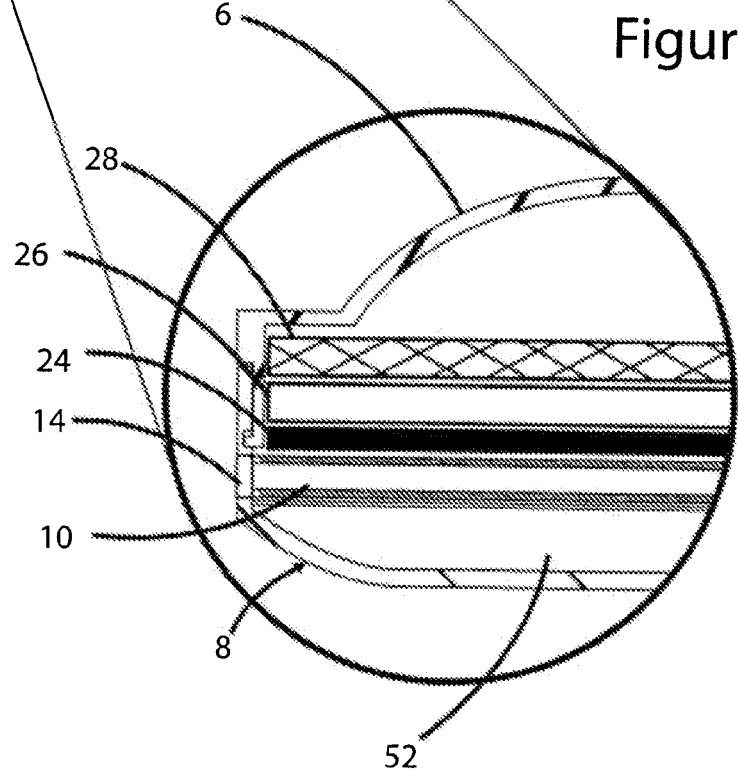
Figure 5B

22

60

72

MODULAR GARDENING SYSTEM

This application claims priority to U.S. Patent App. Ser. No. 61/483,993 for Modular Gardening System, filed May 9, 2011, the disclosure of which is hereby incorporated by reference in its entirety.

BACKGROUND

This invention relates to a modular gardening system having plant modules for growing plant life and water modules for providing water to the plant modules and plant life. The plant modules and water modules may be constructed and interconnected as described below.

SUMMARY OF THE DISCLOSURE

A system for modular gardening including a water module having a reservoir coupled to an aperture such that water in the reservoir flows out the water module via the aperture. The system also including a plant module having a housing having an aperture arranged to transfer water with another module and further having an open region on a top surface of the housing, a first conduit within the housing coupling the aperture and a regulator, a second conduit coupled to the regulator, the second conduit providing water to one or more water absorbent layers arranged atop the second conduit, and plant life at least partially embedded in at least one of the one or more water absorbent layers and receiving light through the open region.

BRIEF DESCRIPTION OF THE DRAWINGS

FIGS. 5, 5B, 6 and 6B are cross-sectional side views of a plant module according to aspects of the present disclosure.

DETAILED DESCRIPTION

Figure 1:
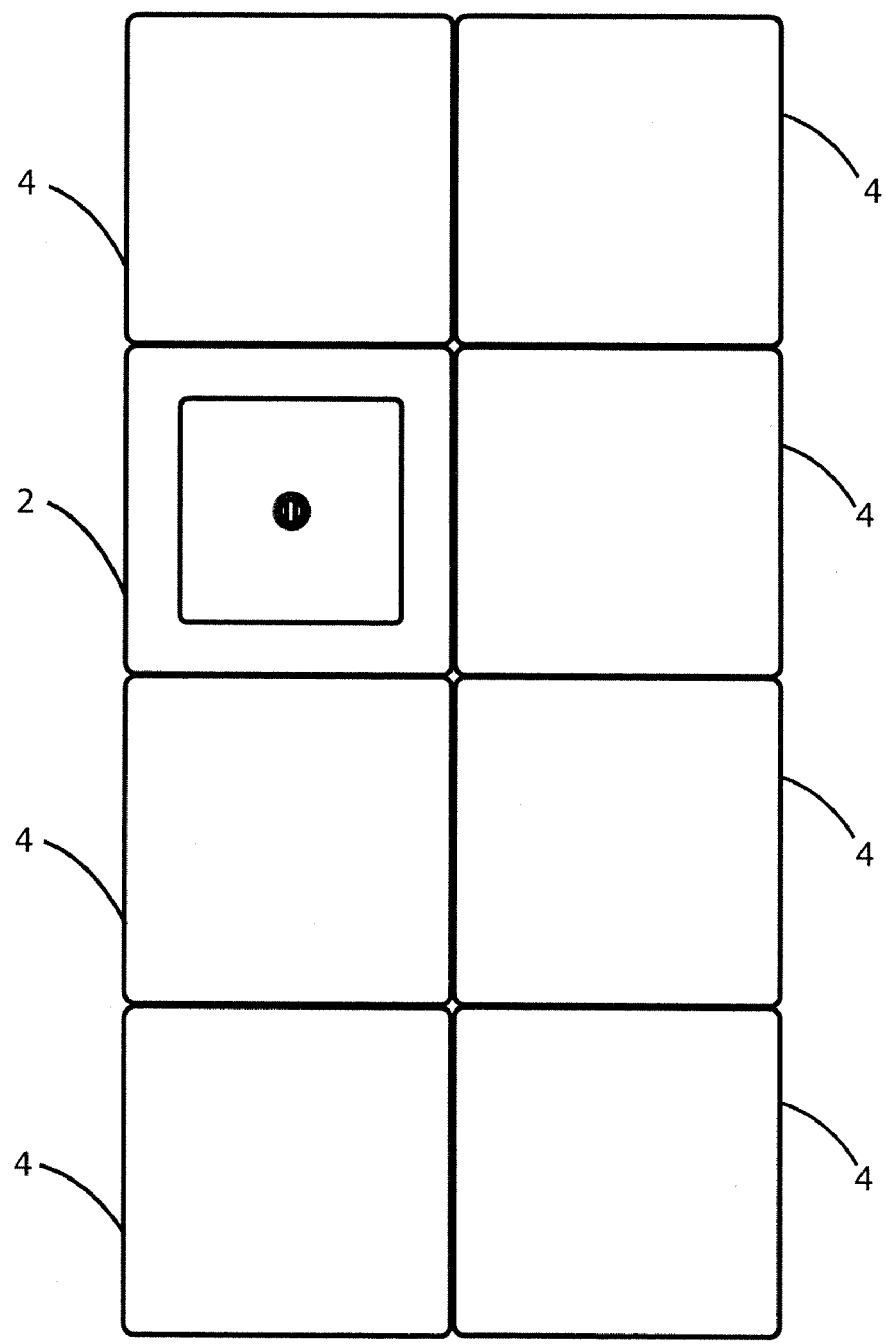
FIG. 1 is a top view of plant modules and water modules according to an aspect of the present disclosure.

FIG. 1 shows a top view of plant modules 4 and water module 2 according to an aspect of the present disclosure. The modular gardening system of the present disclosure may include one or more water modules 2 and one or more plant modules 4 that may be connectably arranged in a variety of ways. Plant modules 4 may contain one or more plants, seedlings, or plant seeds (not shown in this view) that grow when supplied with water. A user may arrange one or more plant modules 4 on a surface, then link those plant modules 4 together as described below. The user may couple one or more water modules 2 to the plant modules 4 such that water module 2 may provide water to one or more plant modules 4, causing plants to grow. Each plant module 4 may contain one or more different types of plant, such that the user may create a garden by arranging plant modules 4 on a surface. In one aspect, plant modules 4 may not contain soil, and plants may be grown hydroponically.

Figure 3:
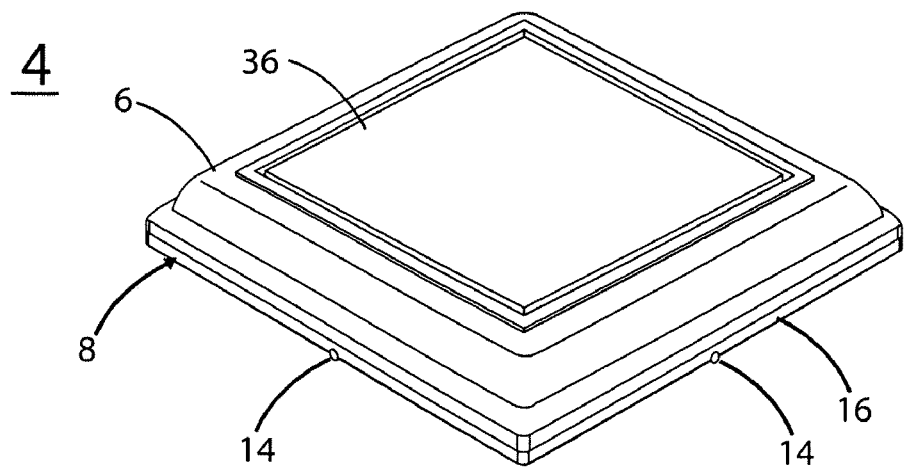
FIG. 3 is a perspective view of a plant module according to an aspect of the present disclosure.
Figure 4:
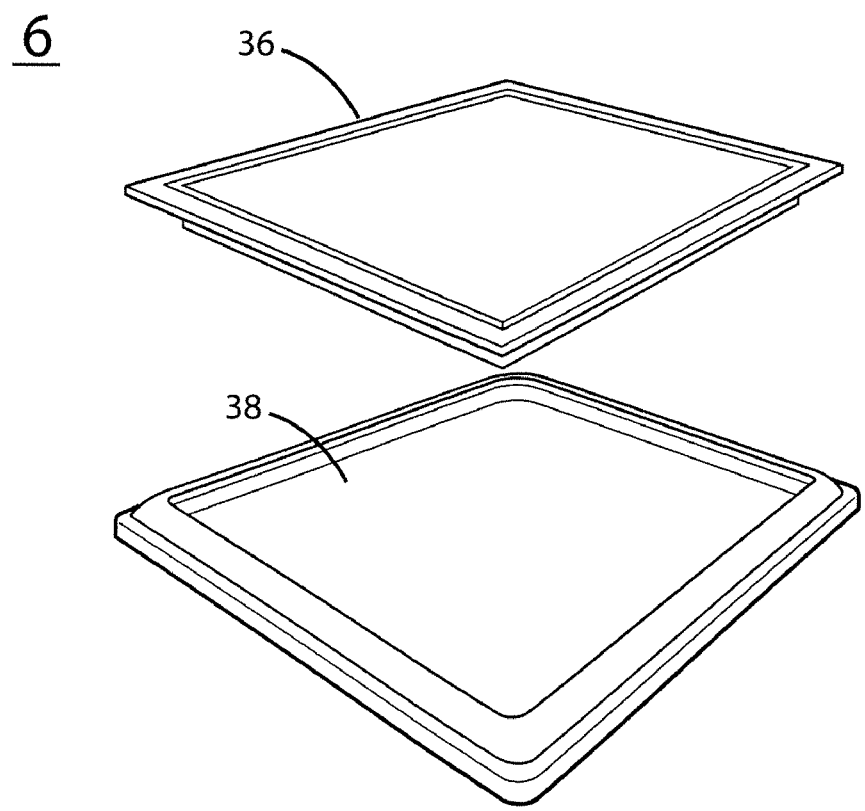
FIG. 4 is a perspective view of a lid of a plant module according to an aspect of the present disclosure.

FIGS. 3 and 4 show perspective views of plant module 4 according to an aspect of the present disclosure. Plant module 4 may include lid 6 and tray 8 together serving as an enclosure. As shown in FIG. 3, tray 8 may have one or more apertures 14 arranged on a vertical wall portion 16 of tray 8 to receive water directly from water module 2 or indirectly via another plant module 4. Tray 8 may further have magnets, adhesive, Velcro, or the like (not shown) on vertical wall portion 16 to facilitate coupling with water module 2 or another plant module 4.

As shown in FIG. 4, lid 6 may have an opening 38 on a top surface through which plants may receive light and grow and removable cover 36 that fits within opening 38. When removable cover 36 is present, the plants may experience increased humidity. Removable cover 36 may be removed after a predetermined time or when plants achieve a certain size. Removable cover 36 may be placed within opening 38, for example, during storage or transport. In one aspect, lid 6 may be (18"×18"×0.5") (45.72 cm×45.72 cm×1.27 cm) 0.10" (0.254 cm) thick injection molded, clear plastic, and tray 8 may be (18"×18"×1.25") (45.72 cm×45.72 cm×3.175 cm) slump formed tray.

Figure 7:
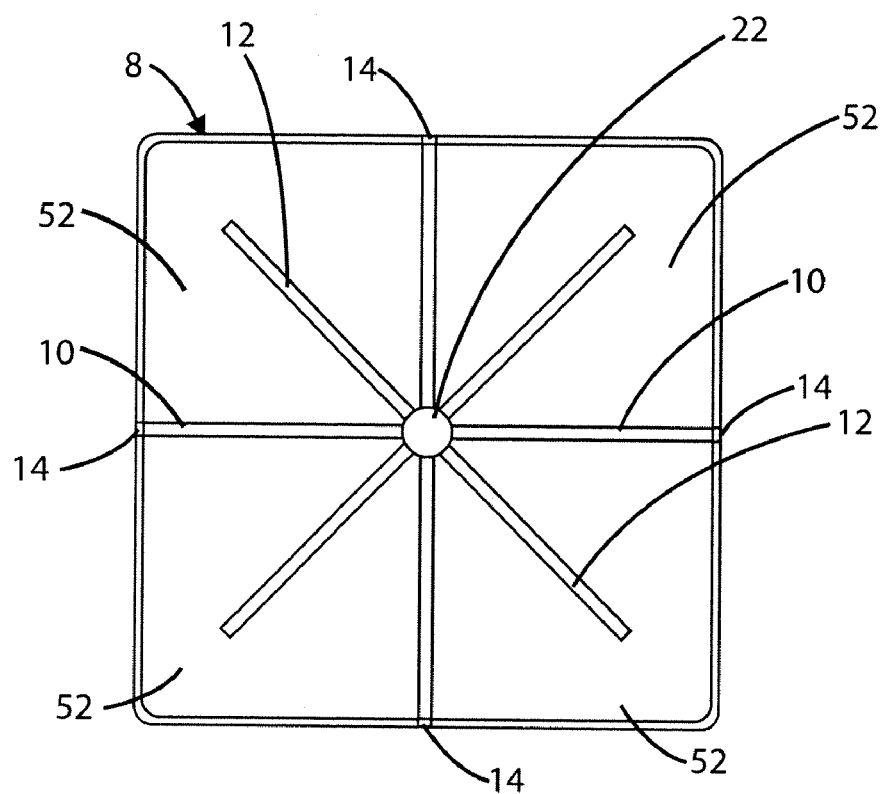
FIG. 7 is a top cross-sectional view of portions of a plant module according to an aspect of the present disclosure.

FIG. 7 shows a top cross-sectional view of portions of tray 8 of plant module 4 according to an aspect of the present disclosure. For ease of view and explanation, FIG. 7 shows tray 8 and portions of plant module 4 relating to transfer of water, but omits portions of plant module 4, for example those relating to a growing medium. Tray 8 may have one or more main conduits 10 and irrigation conduits 12. In one aspect, one or more main conduits 10 may be coupled to and transfer water between aperture 14 and regulator 22. In one non-limiting aspect of the present disclosure, tray 8 may have four main conduits 10 that may be arranged to receive water from water module 2 and to transfer water to other plant modules 4. The four main conduits 10 may extend to any side of tray 8 and may couple to water module 2 and/or another plant module 4 via connector 20 (shown in FIGS. 12 and 13). In one aspect, main conduit 10 may be (0.35"×0.70 linear feet) (0.889 cm×1.77 cm) extruded, clear polyurethane tubing.

Irrigation conduit 12 may distribute water within plant module 4. In one aspect, irrigation conduit 12 may be porous to allow water to enter tray 8 and irrigate plant or seed growing within plant module 4. In one non-limiting aspect of the present disclosure shown in FIG. 7, four irrigation conduits 12 may be arranged to extend from center toward the four corners of tray 8. Main conduit 10 and/or irrigation conduit 12 may be arranged at the bottom of tray 8. In one aspect, irrigation conduit 12 may be (0.25"×0.75 linear feet) (0.635 cm×1.905 cm) porous pipe, mixture of recycled rubber and polyethylene, extruded.

Figures 6, 6B:
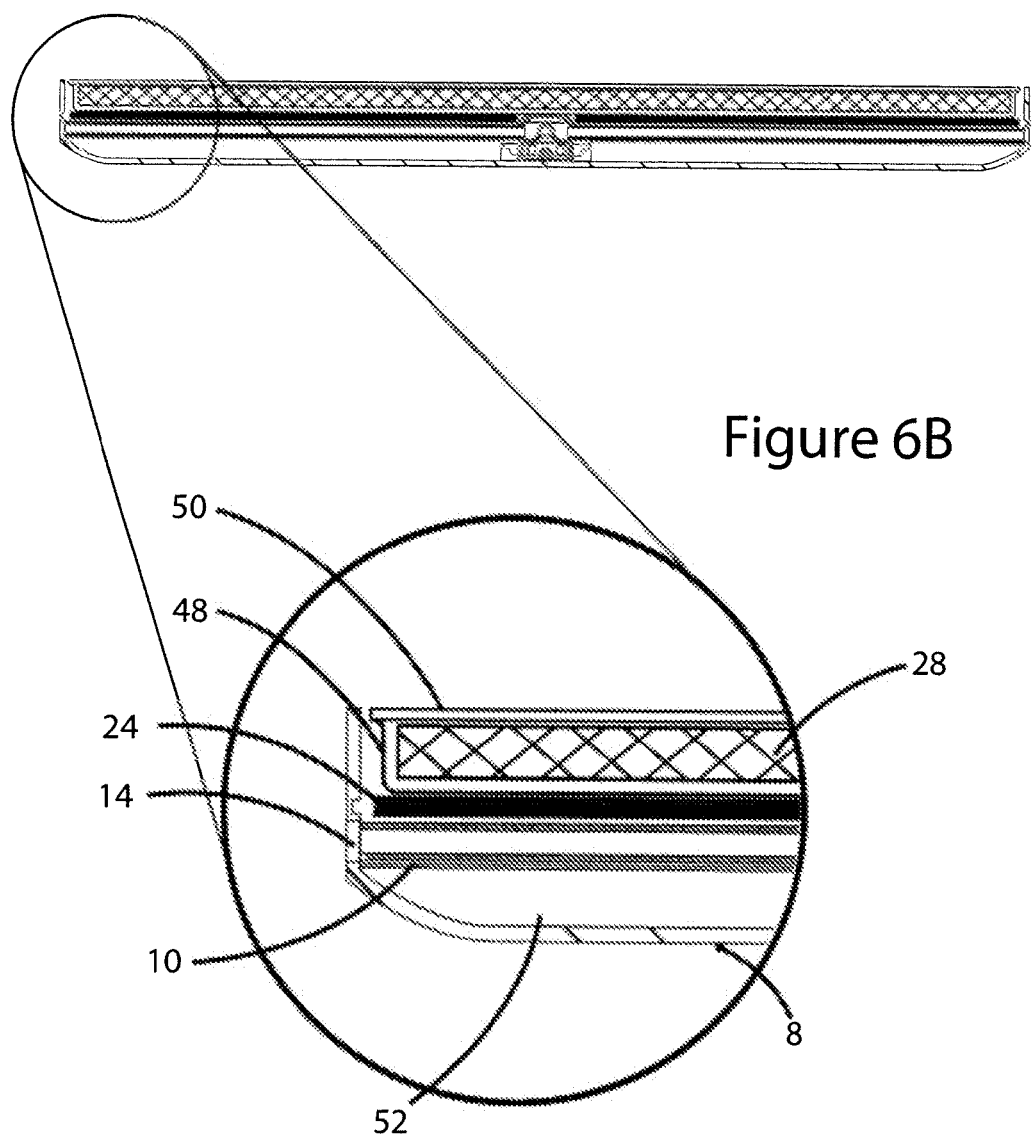

FIGS. 5 and 6 show cross-sectional side views of plant module 4 according to two aspects of the present disclosure. As shown in FIGS. 5 and 6, in addition to main conduits 10, irrigation conduits 12 and regulator 22, plant module 4 may have one or more layers of materials to assist growing plants. Capillary matting 24 may be arranged atop main conduit 10 and/or irrigation conduit 12 (not shown) and may absorb water and provide water to pillow 28. Capillary matting 24 may be an absorbent, synthetic, rot-proof, material that absorbs and facilitates distribution of water. In one aspect, capillary matting 24 may be (8.5"×8.5"×0.15") (21.59 cm×21.59 cm×0.381 cm) die cut matting with 0.25" (0.635 cm) rounded corners. In an aspect shown in FIG. 5, secondary matting 26 may sit atop capillary matting 24 and may hold and absorb moisture.

Secondary matting 26 may be a die cut matting and growth medium for plants, the thickness of which may be determined by the size and type of the plant. Secondary matting 26 retains water moisture for the plants, and the structure of the material may allow for aeration beneficial for plant growth and may provide root structure. Secondary matting 26 may be made of coconut husks, rockwool, or polyethylene terephthalate fibers, perlite, vermiculite, or any growth medium. In one aspect, secondary matting 26 may be (18"×18"×0.35") (45.72 cm×45.72 cm×0.889 cm).

As further shown in FIG. 5, pillow 28 may sit atop secondary matting 26 within tray 8. Pillow 28 may be removed or replaced from tray 8 of plant module 4, for example, to remove or change the plant(s) grown within plant module 4. In one aspect, pillow 28 may be (18"×18"×0.5") (45.72 cm×45.72 cm×1.27 cm) and may include sphagnum peat moss and plant seeds, embedded into an erosion control blanket woven pillow. In other aspects, pillow 28 may be made from hemp, burlap, or any material that retains moisture, allows for proper aeration of seeds, and blocks sunlight.

Figure 8:
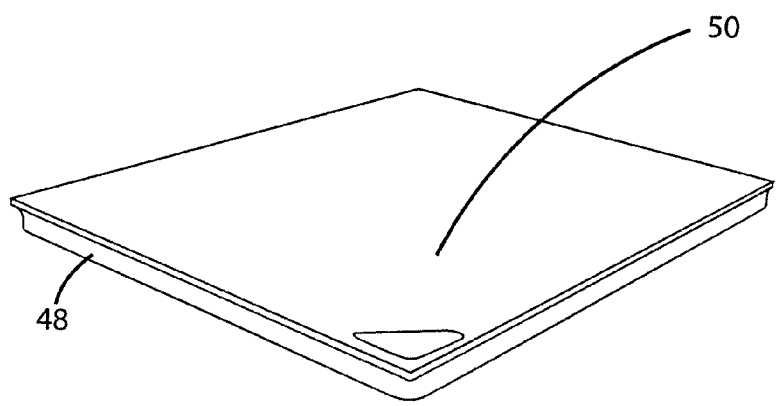
FIG. 8 is a perspective view of water-absorbent package according to an aspect of the present disclosure.
Figure 9:
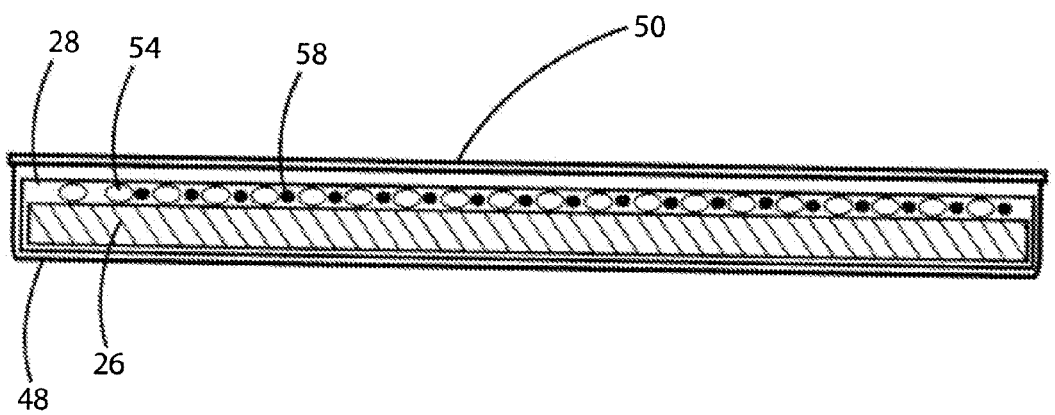
FIG. 9 is a cross-sectional side view of the water-absorbent package and pillow according to an aspect of the present disclosure.

In the aspect shown in FIG. 6, water-absorbent package 48 containing pillow 28 may sit atop capillary matting 24. Water-absorbent package 48 is shown in more detail in FIGS. 8 and 9. Water-absorbent package 48 may contain pillow 28. Pillow 28 may include secondary matting 26, hydrogel granules 58, and seeds 54. Hydrogel granules 58 may provide extra moisture for the plant roots. In one aspect, water absorbent package 48 sits atop capillary matting 24 (shown in FIG. 6) and receives moisture therefrom. Seeds 54 within pillow 28 sprout roots downward into secondary matting 26. The roots then cling to water absorbent package 48 and receive moisture through the water absorbent package 48. Water absorbent package 48 may be a slump formed container made of a super absorbent polymer that absorbs and retains water.

Water absorbent package 48 may have a re-sealable top 50 that allows for increased humidity within package 48 when top 50 is sealed. When plants grow large enough, top 50 may be removed from package 48. When water absorbent package 48 and top 50 are used in this way, lid 6 may not be needed. In this aspect, pillow 28 may be (18"×18"×0.5") (45.72 cm×45.72 cm×1.27 cm) sized woven hemp pillow. Water-absorbent package 48 may be removed or replaced from tray 8 of plant module 4, for example, to remove or change the plant(s) grown within plant module 4.

Figure 10:
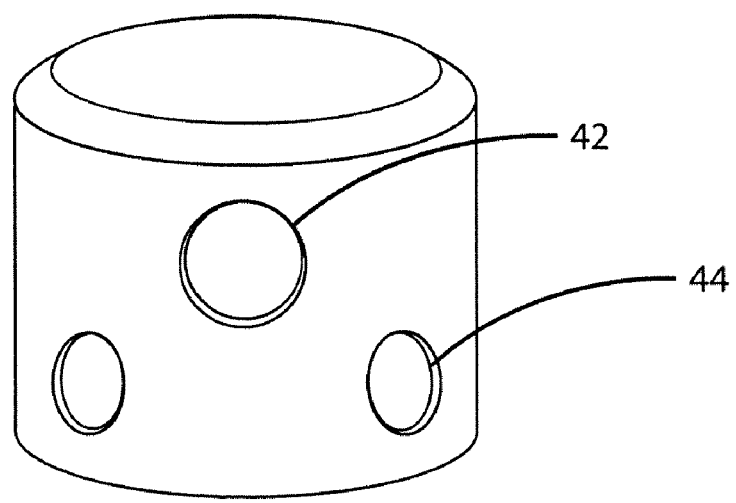
FIG. 10 is a side view of the regulator according to an aspect of the present disclosure.

FIG. 10 shows a side view of regulator 22 with upper apertures 42 for connecting to main conduits 10 and lower apertures 44 for connecting to irrigation conduits 12.

Figure 11A:
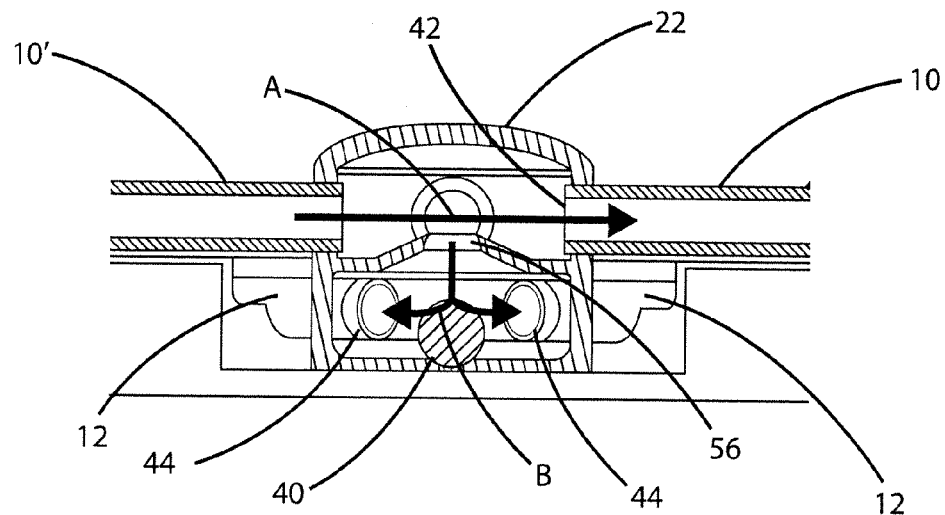
FIGS. 11A and 11B are cross-sectional side views of a regulator and main conduits according to an aspect of the present disclosure.
Figure 11B:
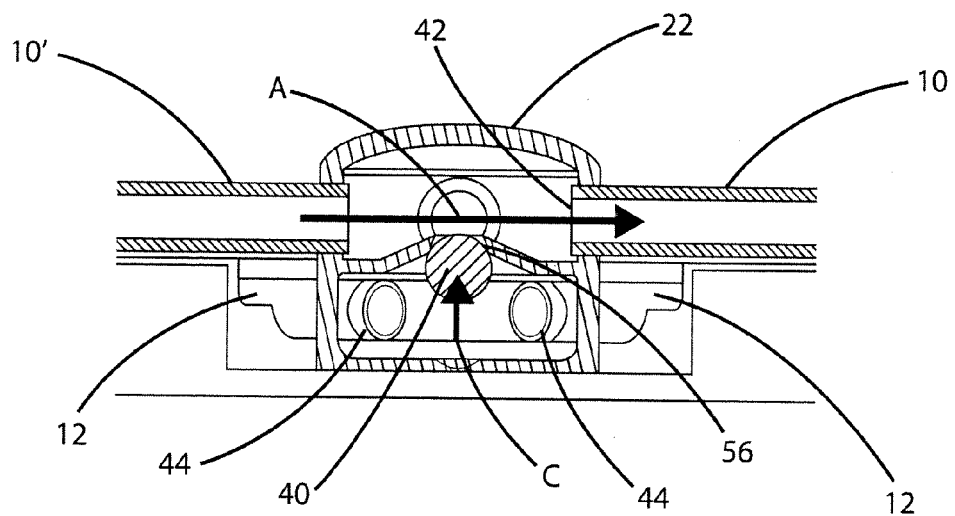

FIGS. 11A and 11B show cross-sectional side views of regulator 22, main conduits 10, and irrigation conduits 12 according to an aspect of the present disclosure. Regulator 22 may connect to and manage the flow of water between main conduits 10 and irrigation conduits 12. FIG. 11A shows a cross-sectional side view of "dry" regulator 22 (i.e., where little or no water is present) coupled to two main conduits 10 and 10' and two irrigation conduits 12. Newly added water may flow in the direction of arrow A through main conduit 10' into regulator 22 via upper aperture 42. Once inside regulator 22, water may flow downward through inner aperture 56 in the direction of arrow B around float 40, which is resting on a floor of regulator 22. Water then flows out lower apertures 44 and into irrigation conduits 12 into tray 8.

FIG. 11B shows a cross-sectional side view of regulator 22 after sufficient water is applied. When sufficient water is applied, in one example, approximately 2.35 liters of water, water may flow through irrigation conduits 12, fill reservoir 52, and cause float 40 to rise in direction of arrow C and contact inner aperture 56 forming a seal and blocking the flow of water from main conduit 10' to irrigation conduits 12. Water may then flow from main conduit 10' past sealed inner aperture 56 to main conduit 10 in direction of arrow A, possibly to another module if so connected. It will be understood that water may originate from and flow to either direction between main conduits 10' and 10. In one aspect, regulator 22 may be (1.125"×1.0") injection molded plastic.

Water that enters irrigation conduit 12 exits via pores or openings in irrigation conduit 12, then settles and accumulates within reservoir 52, typically maintaining a consistent level of water within reservoir 52. In one aspect, water is then wicked upward through capillary matting 24, which helps maintain a consistent level of moisture. Seeds within pillow 28 sprout downward into secondary matting 26 and receive moisture from capillary matting 24.

Figure 12:
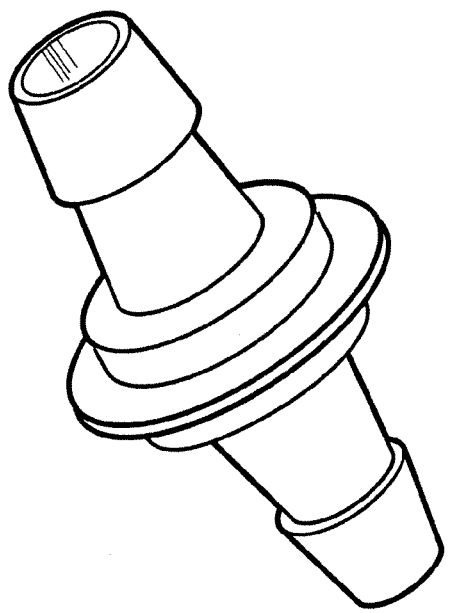
FIG. 12 is a perspective view of a connector according to an aspect of present disclosure.
Figure 13:
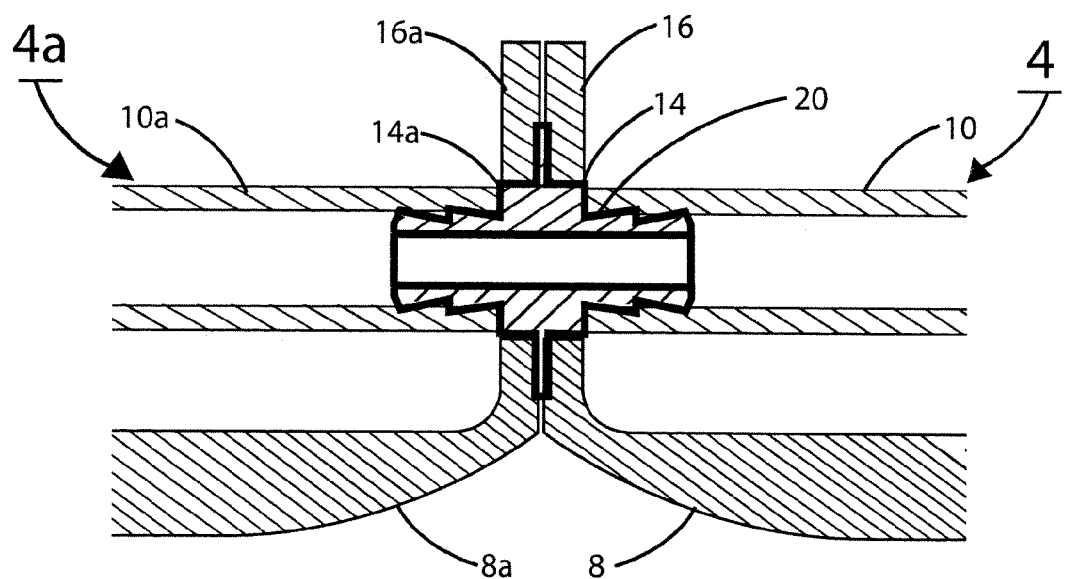
FIG. 13 is a cross-sectional side view of a connector connecting two main conduits according to an aspect of present disclosure.

FIG. 12 shows a perspective view of two-ribbed connector 20 according to an aspect of present disclosure. As shown in FIG. 13, connector 20 may be inserted in apertures 14 and 14a of two modules to facilitate water transfer between the two modules, such as two plant modules 4, two water modules 2 or between water module 2 and plant module 4. Connector 20 may connect main conduit 10 of tray 8 of a first plant module 4 with main conduit 10a of tray 8a of a second plant module 4a, thereby allowing water to flow between the modules. In one aspect, connector 20 may be (0.60"×0.40"×0.40") (1.52 cm×1.01 cm×1.01 cm) injection molded plastic.

Figure 14:
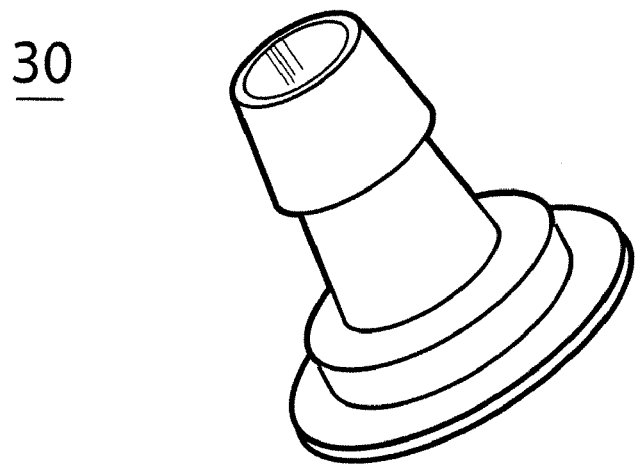
FIG. 14 is a perspective view of a plug according to an aspect of present disclosure.
Figure 15:
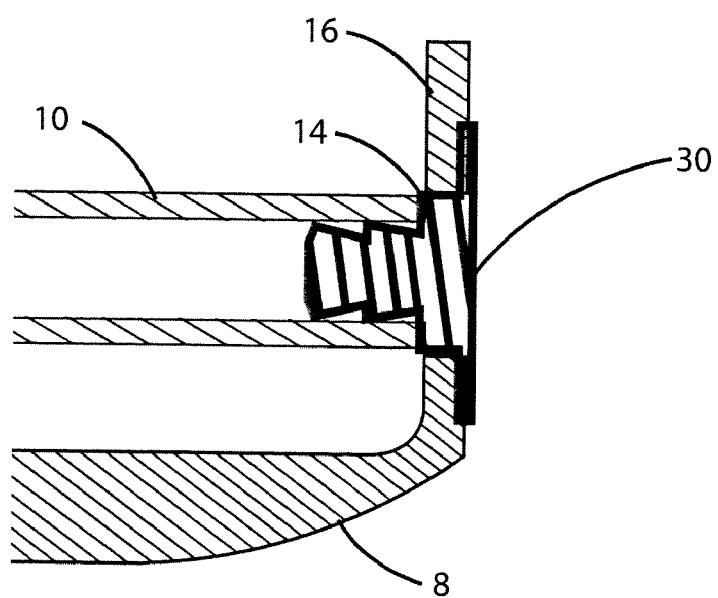
FIG. 15 is a cross-sectional side view of a plug sealing a main conduit from an aperture according to an aspect of present disclosure.

As shown in FIGS. 14 and 15, plug 30 may fit into aperture 14 to prevent transfer of water out of a module, for example when aperture 14 is not connected to another module, such as water module 2 or another plant module 4. Plug 30 may be (0.30"×0.45"×0.45") (0.762 cm×1.14 cm×1.14 cm) injection molded plastic. In another aspect, plug 30 may be sized and configured to fit within connector 20 when connector is present in aperture 14.

Figure 2:
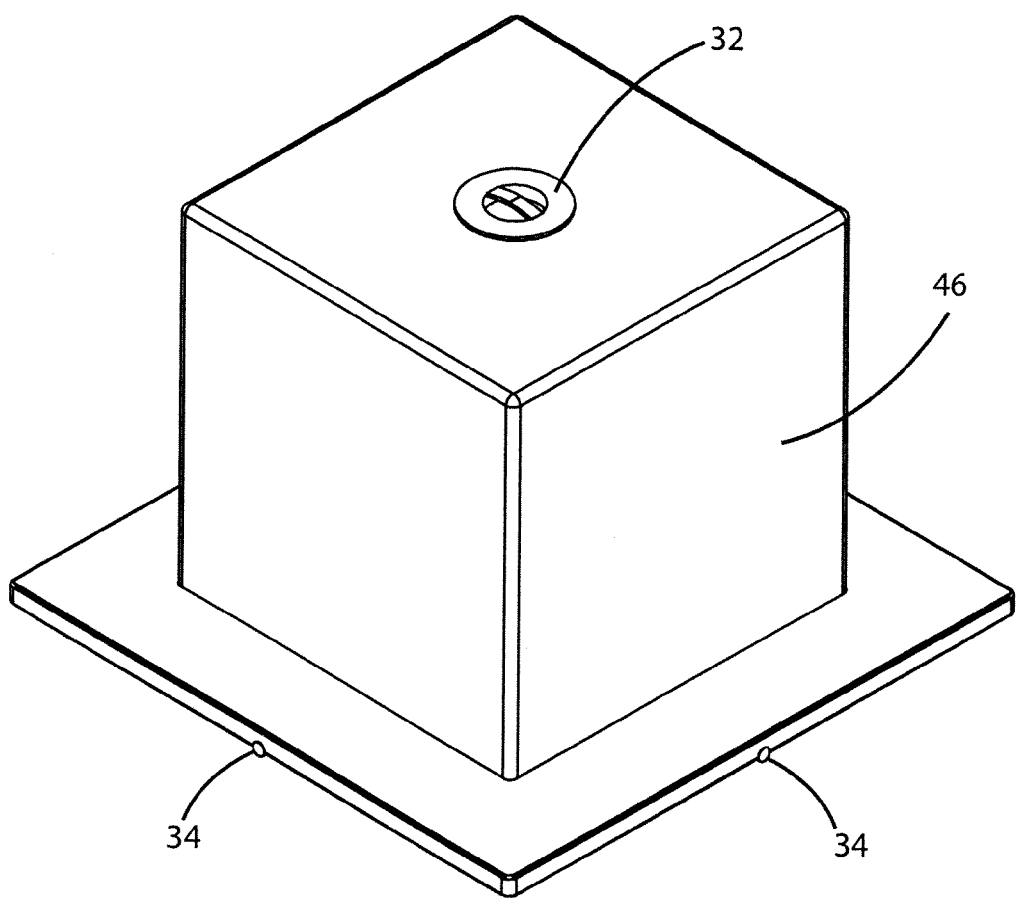
FIG. 2 is a perspective view of a water module according to an aspect of the present disclosure.
Figure 16:
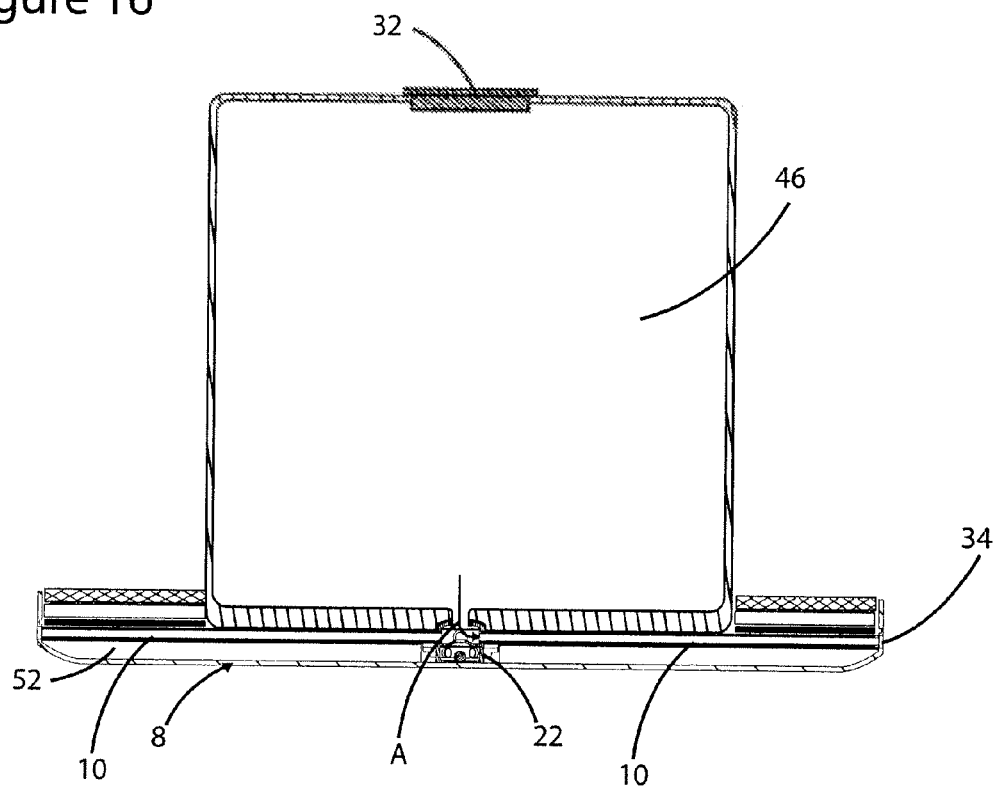
FIG. 16 is a cross-sectional side view of a water module.

FIG. 2 shows a perspective view of water module 2 according to an aspect of the present disclosure. Water module 2 may be connected to plant module 4 via one or more connectors 20 as described above. Water module 2 may have lid 32 allowing access to an internal water reservoir 46. Water in reservoir may be gravity fed through water module 2 out aperture 34 via connector 20 to plant module 4. In one aspect, water module 2 may be (18"×18"×12.5") (45.72 cm×45.72 cm×31.75 cm) 0.10" (0.25 cm) thick injection molded plastic such as polypropylene and may be formed using an injection molding process. FIG. 16 shows a cross-sectional side view of water module 2 according to one aspect in which reservoir 46 couples to tray 8, which was described in connection with plant module 4 above. In that aspect, water may travel through regulator 22 and out aperture 34 via main conduit 10.

Figure 17:
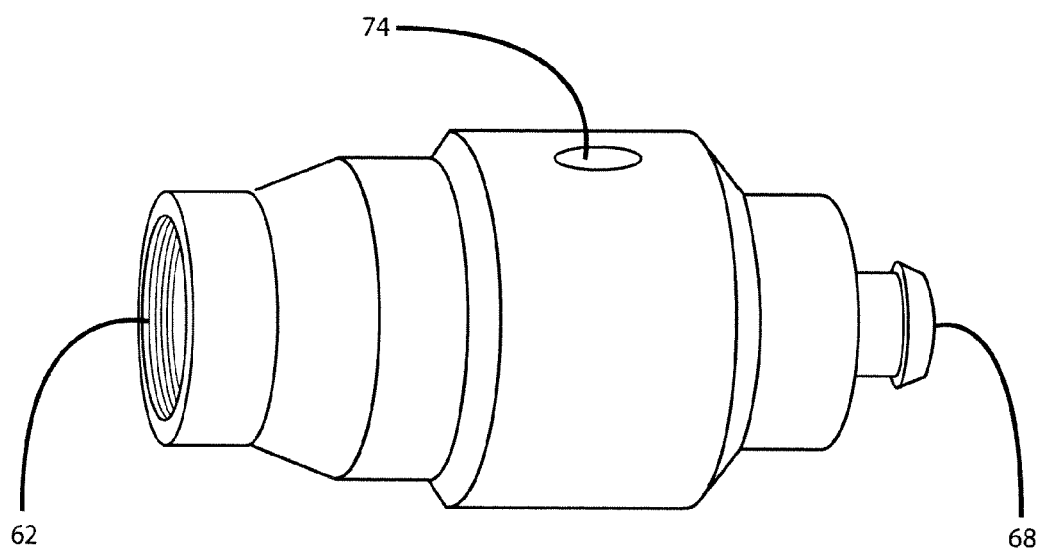
FIG. 17 is a perspective view of a water pressure regulator.
Figure 18:
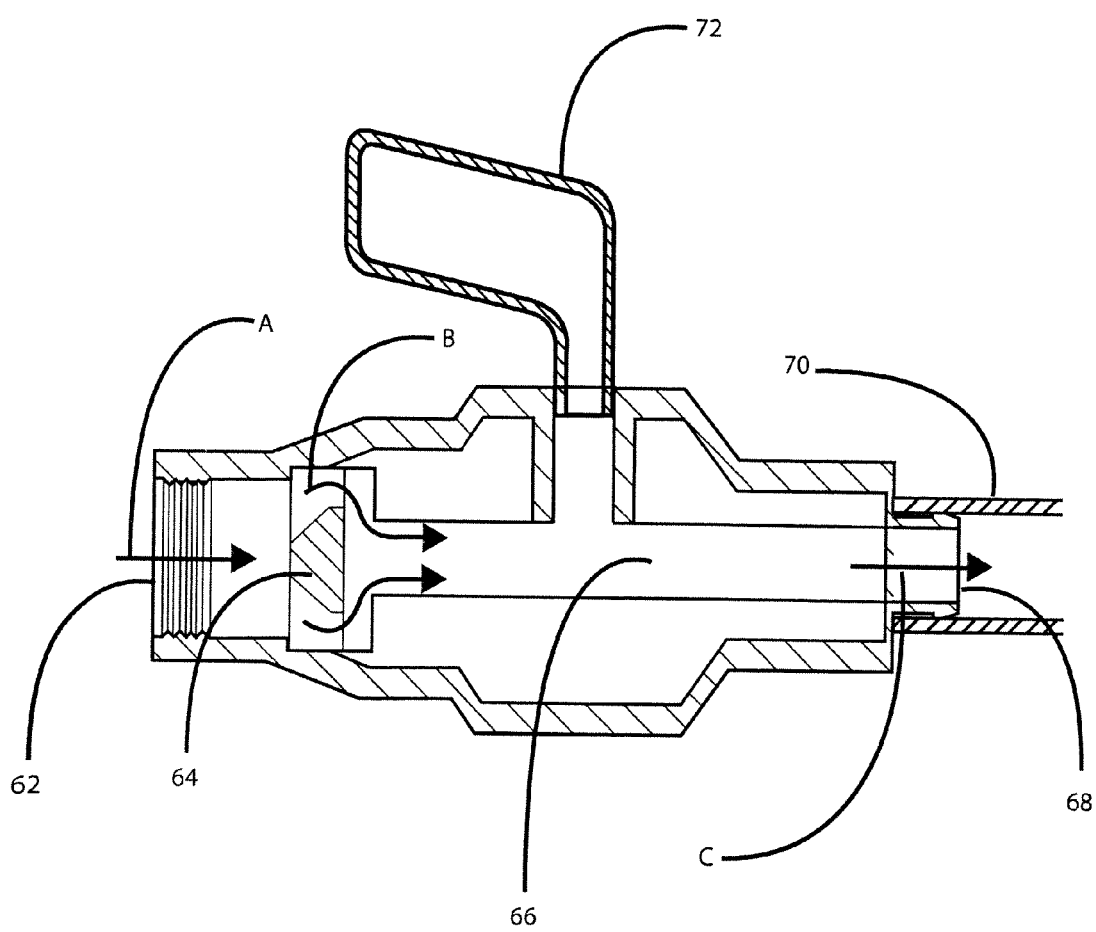
FIG. 18 is a cross sectional side view of a water pressure regulator.
Figure 19:
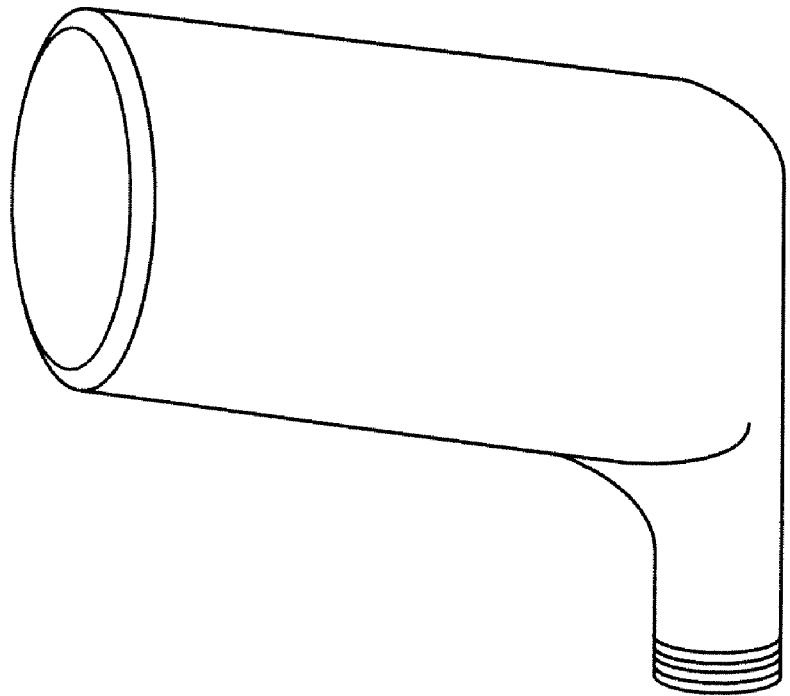
FIG. 19 is a perspective view of a fertilizer bottle.

FIG. 17 shows a perspective view of a water pressure regulator 60. Water pressure regulator 60 is an optional component that may connect to a faucet or garden hose and provides water directly to plant module 4 without the use of water module 2. Inlet aperture 62 may attach to faucet head (not shown). As shown in FIG. 18, water flows into inlet aperture 62 in direction indicated by arrow A and is directed around seat 64 in direction indicated by arrow B. Water then flows through inner channel 66 and out of water pressure regulator 60 through outlet aperture 68 in direction indicated by arrow C. Outlet aperture 68 may be attached to conduit 70. Water flows through conduit 70 and attached connector 20, which may be attached to plant module 4. Water pressure regulator 60 may have aperture 74 to attach fertilizer bottle 72. Fertilizer bottle 72 may detachably connect to regulator 60 via aperture 74 and steadily supplement the water flowing through inner channel 66 with liquid fertilizer at a proportioned rate.

Numerous additional modifications and variations of the present disclosure are possible in view of the above teachings. It is therefore to be understood that within the scope of the appended claims, the present disclosure may be practiced other than as specifically described herein.

The invention claimed is:

1. A system for modular gardening, comprising:
  a water module comprising a reservoir coupled to an aperture such that water in the reservoir flows out the water module via the aperture; and
  a plant module comprising:
    a housing having an aperture arranged to transfer water with another module and further having an open region on a top surface of the housing;
    a first conduit within the housing coupling the aperture and a regulator;
    a second conduit coupled to the regulator, the second conduit providing water to one or more water absorbent layers arranged atop the second conduit; and
    plant life at least partially embedded in at least one of the one or more water absorbent layers and receiving light through the open region,
    wherein the one or more absorbent layers include a first matting, a secondary matting, and a pillow that contains the secondary matting, hydrogel granules, and seeds.

2. The system of claim 1, wherein the second conduit is at least semi-porous tubing.

3. The system of claim 1, wherein the regulator includes a float that floats in water and forms a seal with an inner aperture of the regulator preventing flow of water from the first conduit to the second conduit when sufficient water is present.

4. The system of claim 1, wherein the pillow is inside a water-absorbent package having a re-sealable lid.

5. The system of claim 4, wherein the water-absorbent package is removably arranged within the plant module.

6. The system of claim 1, wherein one or more of the water absorbent layers are removably arranged within the plant module.

7. The system of claim 1, where the plant module further comprises another first conduit coupling the regulator to another aperture of the plant module.

8. The system of claim 1, further comprising a connector configured to couple to and permit the flow of water between the water module aperture and the plant module aperture.

9. A system for modular gardening including a plant module comprising:
  a housing having an aperture arranged to transfer water with another module and further having an open region on a top surface of the housing;
  a first conduit within the housing coupling the aperture and a regulator;
  a second conduit coupled to the regulator, the second conduit providing water to one or more water absorbent layers arranged atop the second conduit; and
  plant life at least partially embedded in at least one of the one or more water absorbent layers and receiving light through the open region,
  wherein the one or more absorbent layers include a first matting, a secondary matting, and a pillow.

10. The system of claim 9, further comprising: a water module having a reservoir coupled to an aperture such that water in the reservoir flows out the water module via the aperture.

11. The system of claim 9, wherein the regulator includes a float that floats in water and forms a seal with an inner aperture of the regulator preventing flow of water from the first conduit to the second conduit when sufficient water is present.

12. The system of claim 9, wherein the pillow contains the secondary matting, hydrogel granules, and seeds.

13. The system of claim 12, wherein the pillow is inside a water-absorbent package having a re-sealable lid.

14. The system of claim 13 wherein the water-absorbent package is removably arranged within the plant module.

15. The system of claim 9, wherein one or more of the water absorbent layers are removably arranged within the plant module.

16. The system of claim 9, where the plant module further comprises another first conduit coupling the regulator to another aperture of the plant module.

17. The system of claim 9, further comprising a connector configured to couple to and permit the flow of water between the water module aperture and the plant module aperture.

* * * * *